Patented June 3, 1924.

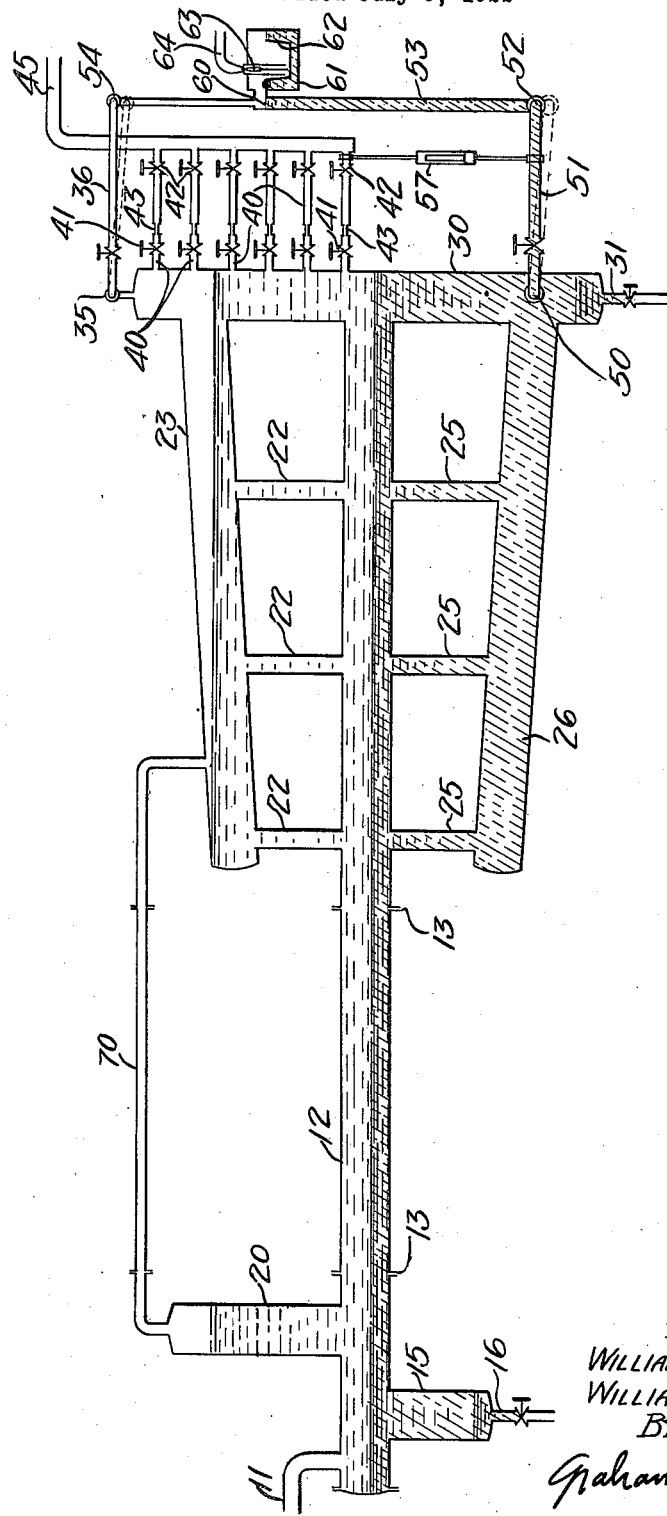

1,496,090

UNITED STATES PATENT OFFICE.

WILLIAM M. MARKER AND WILLIAM R. ALLEN, OF VENTURA, CALIFORNIA.

TRAPPED OUTLET SEPARATOR.

Application filed July 5, 1922. Serial No. 572,925.

*To all whom it may concern:*

Be it known that we, WILLIAM M. MARKER and WILLIAM R. ALLEN, both citizens of the United States, residing in Ventura, Ventura County, California, have invented a new and useful Improvement Comprising a Trapped Outlet Separator, of which the following is a specification.

Our invention relates to the operation of oil wells and particularly to the separation of water from the oil ordinarily produced by such wells.

While the greatest care is exercised in drilling oil wells, it is often impossible to prevent the entrance of water thereinto, and many very valuable wells produce a considerable proportion of water which is mixed with the oil as it flows from the well. We have found that where the oil and water are allowed to flow under pressure and at high velocities, through constricted orifices, that emulsions of oil and water are formed which are quite stable and difficult to separate. This we believe to be due to the breaking up of the water into very fine particles in the rapidly moving stream of oil and water.

If, on the contrary, the oil and water are allowed to flow at a low velocity into a separating chamber, we have found that the stratification of the oil and water takes place and no emulsion is formed.

It is, however, necessary, if high velocities are to be prevented, that the natural gas pressure of the well be controlled to a certain degree. That is to say, if the well is allowed to flow freely and without restraint, very high velocities are attained in the oil sands and in the piping of the well, and the emulsion is very likely to be formed therewithin. We therefore prefer to maintain a pressure on the well, relieving this pressure through constricted orifices but providing means for separating the water and oil before these orifices are reached; thus allowing the water to escape through one channel and the oil and gas to escape from a different channel, so that a mixture of water and oil is not passed through in one of these constricted orifices.

By this means we prevent emulsification of the water and oil, separating the water by gravity before it becomes emulsified and thus solving one of the hardest problems met with in the production of oil, namely, the reduction of emulsions.

Referring to the drawing which is for illustrative purposes only and which is entirely diagrammatic, 11 is a pipe which is connected directly to an oil well producing oil, water, and gas. This oil, water, and gas is delivered into a horizontal chamber formed preferably by a pipe 12. This pipe may be made of any suitable length, being provided with joints at 13 and may be of any desired diameter, the diameter depending upon the average rate of flow of the well to which it is connected. Opening into the bottom of the pipe 12 near the inlet 11 is a sand trap 15 which is provided with a valved outlet 16. The purpose of this sand trap is to separate and collect any sand or other solid matter entering pipe 12.

Connected with the top of the pipe 12, just beyond the sand trap 15 is a gas dome 20, the purpose of this gas dome being to collect any free gas carried in the oil and thus reduce the volume of fluid which must flow through the pipe 12. This reduction in volume reduces the rate of flow and allows more time for stratification. In the pipe 12, the oil and water tend to stratify according to their specific gravities, the water falling to the bottom of the pipe and the oil rising to the top.

The oil is conducted by means of oil risers 22 into an oil header 23 which is preferably inclined as shown and which forms an additional point in which gas may escape from the oil.

Water is conducted from the bottom of the pipe 12 through water risers 25 into a water header 26 which is preferably inclined as shown for the purpose of preventing sand from remaining therein.

The headers 23 and 26 and the pipe 12 are all connected into a vertical pipe 30 which is provided with a valved sand outlet 31 at its bottom and which is connected through a swivel coupling 35 with a pressure equalizing pipe 36 at its top.

Connected into the upper portion of the pipe 30 above the point of junction of the pipe 12 and pipe 30 are a series of gas and oil outlet pipes 40, each of these pipes being provided with valves 41 and 42 and with a member 43 having a constricted opening which is placed between the valves 41 and 42. All of these pipes 40 communicate with an outlet pipe 45, as shown.

Connected into the lower portion of the chamber 30 by means of a swivel coupling 50 is a water outlet pipe 51 which is connected by means of a swivel coupling 52 with a water overflow pipe 53. This water overflow pipe 53 is also connected by means of a swivel coupling 54 with the pipe 36. A turn buckle 57 is provided by means of which the pipe 53 may be raised and lowered. Connected into the pipe 53 at a point 60 is a standard form of steam trap 61 which has a hinged bucket 62 controlling a valve 63 in an outlet 64.

Steam trap 61 is of standard construction and any other form of trap may be substituted therefor, provided it is so constructed that it will allow a liquid to flow through the pipe 64 but will immediately shut off any flow of gas therethrough.

The method of operation of the invention is as follows. The oil, gas, and water, under a pressure which may amount to several hundred pounds per square inch is delivered from the well through the pipe 11 into the inlet end of the pipe 12. Due to the fact that pressure is maintained, by means which will hereafter be described, the flow of liquid in the well and in the pipe 12 is at all times at a low velocity and there is very little tendency to emulsify the fluids therein. The fluids following through the pipe 12 first of all drop any sand or other solid into the sand trap 15, from which these solids may be removed through the outlet 16. The greater portion of the free gas is delivered into the gas dome 20, flowing through a pipe 70 into the oil header 23 which pipe leads from the top of said dome into the top of said header. The oil and water tend to stratify in the pipe 12, the oil rising through the pipes 22 into the oil header 23 and the water falling through the pipes 25 into the water header 26.

All water is taken off through the pipe 51 to be delivered through the trap 61 to the water outlet pipe 64. By raising and lowering the pipe 53 and the trap 61 the level of water in the pipe 12 may be maintained at any desired level; the weight of the column of water in the pipe 53 being balanced against the weight of the oil and water in the pipe 30, since the pressure on the top of both of these columns is maintained the same through the medium of the pressure equalizing pipe 36.

The result is that the trap 61 tends to maintain a more or less definite water level in the pipe 12, water flowing freely as fast as it is produced, the trap 61 shutting off any flow of gas therethrough and the principle of hydrostatic pressure preventing oil from flowing in the pipe 53, due to the fact that as soon as the water level falls below the bottom of the pipe 12, the weight of the oil and water in the pipe 30 is not sufficient to overbalance the weight of the water in the pipe 53 and the water level therein drops correspondingly and no flow is accomplished through the trap 61.

The pressure in the interior of the device is maintained by means of the constricting openings 43 which are made of sufficiently small size to produce a very large friction head inside the apparatus. This head is sufficient to hold a considerable pressure on the device at all times. Since the pipes 40 are all above the water level, water cannot flow through these pipes; but a mixture of oil and gas may flow through into the pipe 45. The oil and gas may then be mutually separated by any convenient and well known means. It will be seen that our invention comprises the idea of producing a stratification of oil and water under pressure for the purpose of preventing emulsification.

We claim as our invention:

In a separator for use in connection with an oil well, the combination of: walls forming a horizontal chamber through which the fluid from the well is allowed to flow, said chamber being of sufficient size with relation to the average flow of the well to allow a stratification of oil and water to take place therein; pipe means connecting said chamber with the well, said pipe means being of sufficient size to deliver fluid from said well to said chamber at the average rate of flow of said well with a small drop in pressure; an oil header above said chamber; an oil riser conducting oil from said chamber into said header; a water header below said chamber; a water riser connecting said chamber with said header; walls forming a vertical chamber in open communication with said horizontal chamber and with said water and oil headers; means for taking off water from the lower end of said vertical chamber; and means for taking off oil from the upper end of said vertical chamber.

In testimony whereof, we have hereunto set our hands at Ventura, California, this 28th day of June, 1922.

WILLIAM M. MARKER.
WILLIAM R. ALLEN.